United States Patent [19]

Sankaran

[11] Patent Number: 5,376,996
[45] Date of Patent: Dec. 27, 1994

[54] POLYPHENYLENE SULFIDE-PTFE COATING FOR FUSER ROLL

[75] Inventor: Velliyur R. Sankaran, Tucson, Ariz.

[73] Assignee: International Business Machines Corporation, Armonk, N.Y.

[21] Appl. No.: 992,282

[22] Filed: Dec. 16, 1992

[51] Int. Cl.⁵ ............................................ G03G 15/20
[52] U.S. Cl. .................................... 355/282; 219/216
[58] Field of Search ............... 355/285, 290, 295, 282; 219/216; 430/98–100, 124; 29/895; 118/60; 428/421, 422, 461–463; 427/428, 201–205

[56] References Cited

U.S. PATENT DOCUMENTS

| | | | |
|---|---|---|---|
| 3,877,970 | 4/1975 | Edmonds, Jr. et al. | 427/379 |
| 3,925,530 | 12/1975 | Rees | 264/297.1 |
| 4,212,923 | 7/1980 | Brady | 428/419 |
| 4,443,574 | 4/1984 | Coq et al. | 524/423 |
| 4,470,688 | 11/1984 | Inagaki et al. | |
| 4,654,235 | 3/1987 | Effenberger et al. | 427/407.3 |
| 4,703,076 | 10/1987 | Mori | 524/420 |
| 4,787,991 | 1/1988 | Morozumi et al. | 252/12.4 |
| 4,829,931 | 5/1989 | Mogi | 118/60 |
| 4,910,559 | 3/1990 | Kuge et al. | 355/285 |
| 4,965,297 | 10/1990 | Funami et al. | 523/217 |
| 5,009,959 | 4/1991 | Matsushita et al. | 428/419 |
| 5,115,278 | 5/1992 | Maruta et al. | 355/285 |
| 5,133,998 | 7/1992 | Okazaki et al. | 427/428 |
| 5,196,675 | 3/1993 | Suzuki et al. | 219/216 |
| 5,200,454 | 4/1993 | Nakano | 524/409 |
| 5,250,356 | 10/1993 | Batzar | 428/421 |

FOREIGN PATENT DOCUMENTS 0157781 6/1990 Japan.

OTHER PUBLICATIONS

Atwood et al, "Coating Composition Comprising PTFE, Polyphenylene Sulfide and a Polysulfone", in Defensive Publication T952,005, Published Nov. 2, 1976.

Primary Examiner—Matthew S. Smith
Assistant Examiner—T. A. Dang
Attorney, Agent, or Firm—Saul A. Seinberg

[57] ABSTRACT

A fuser roll for fusing toner (12) onto paper (10) in electrophotographic printers and copiers is made of a hollow metal tube (14) provided with a coating (18), of about 60 to 90 wt % polyphenylene sulfide (PPS) and about 10 to 40 wt % polytetrafluoroethylene (PTFE). Up to about 40 wt % of a filler may be added to the total composition. The fuser roll coated with the PPS-PTFE composition of the invention results in improved fusing of the toner, providing a matt finish of the fused toner on paper, improved uniformity of print quality, longer wear of the fuser roll, and reduced toner smear. The PPS-PTFE roll produces better toner fusing with both rough and smooth papers, and performs better at the same fuser roll temperature of 190° C. than PTFE fuser rolls.

16 Claims, 1 Drawing Sheet

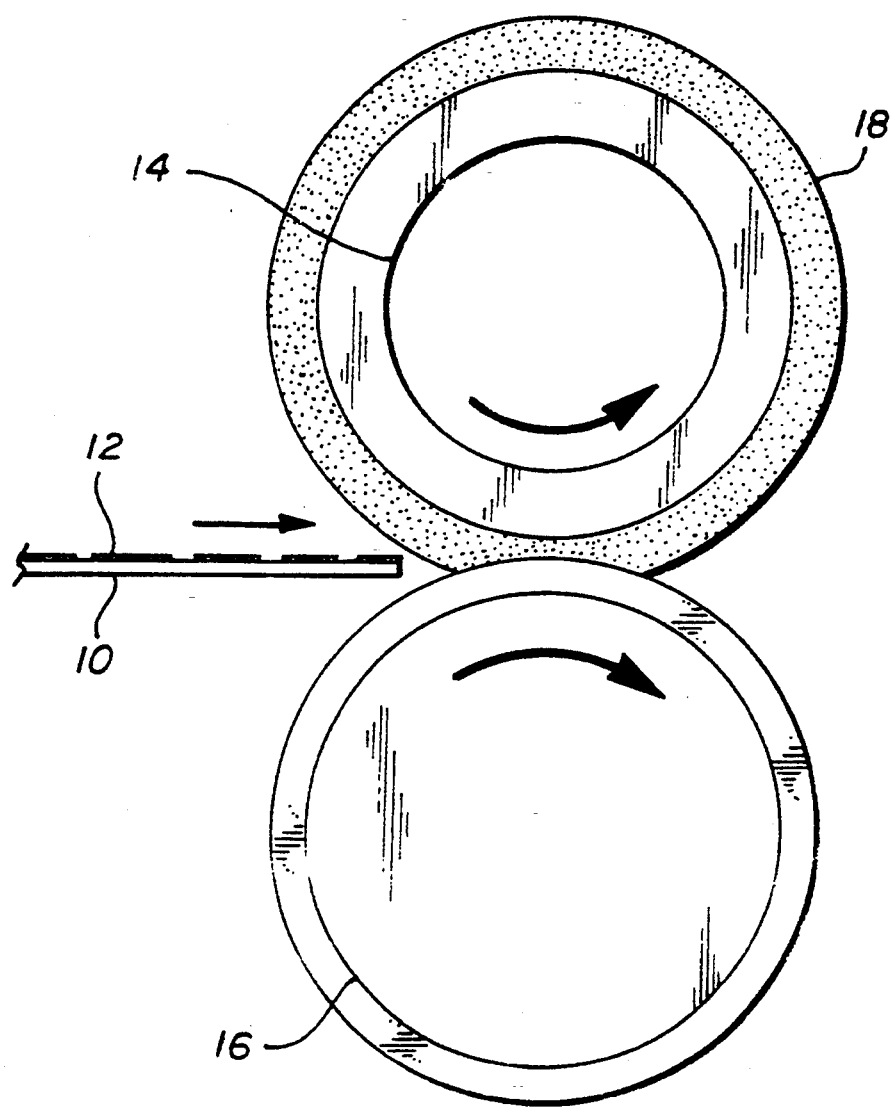

POLYPHENYLENE SULFIDE-PTFE COATING FOR FUSER ROLL

BACKGROUND OF THE INVENTION

1. Field of the Invention:

The present invention relates generally to electrophotographic printing and copying, and, more particularly, to an improved hot roll, or fuser roll, used to fuse toner onto paper or other print medium to produce a printed or copied image.

2. Description of the Related Art:

Electrophotographic printing or copying apparatus employs a hot roll, or fuser roll, in the paper path in order to fuse the toner onto the paper or other print medium so as to produce a suitable image. The fuser roll comprises a hollow tube, typically made of aluminum or other heat conductive material, which is heated from within by a heating means, such as a quartz lamp. The fuser roll is provided with a coating for assisting in fusing the toner to the paper.

The fuser roll is typically heated to about 190° C. Fuser roll coatings that have been used to fuse toner to paper include silicone rubber and polytetrafluoroethylene (PTFE), commonly known as Teflon. Silicone rubber does not permit a good throughput, wears relatively fast, and requires frequent changing of the fuser roll. PTFE provides a hard, non-compliant surface. As a consequence, fusing is not as good as silicone rubber fuser rolls, and the resulting image is glossy. A glossy image is objectionable because of the specular reflection it produces, rendering bar codes, for example, difficult to read by certain laser scanners.

Thus, there remains a need for a coating for a fuser roll that provides good print quality that is non-glossy, improved fusing of toner to paper, and longer wear.

SUMMARY OF THE INVENTION

In accordance with the invention, a fuser roll for electrophotographic printing and copying is provided with a coating comprising a mixture of polyphenylene sulfide (PPS) and PTFE. In particular, the coating comprises about 60 to 90 wt % PPS and about 10 to 40 wt % PTFE. Filler is added to the PPS-PTFE composite in an amount of about 10 to 40 wt of the total composition.

The fuser roll coated with the PPS-PTFE composition of the invention results in improved fusing of the toner, providing a matt finish of the printed image, improved uniformity of print quality, longer wear of the fuser roll, and reduced toner smear. In particular, the composite fuser roll produces better fusing with both rough and smooth papers. At the same fuser roll temperature of 190° C., the PPS-PTFE roll of the present invention performs better than PTFE rolls.

BRIEF DESCRIPTION OF THE DRAWINGS

The sole Figure is a side elevational view, depicting paper with a coating of toner thereon passing between a fuser roll, provided with the coating of the invention, and a pressure roll.

DESCRIPTION OF THE INVENTION

Referring now to the drawing, which depicts a portion of an electrophotographic printer or copier, a sheet of paper 10, portions of which are coated with unfused toner 12, is passed between a hot roll, or fuser roll, 14 and a pressure roll 16. The surface of the fuser roll 14 is maintained at a temperature sufficient to fuse the toner onto the paper 10 to provide a permanent image.

As indicated earlier, the fuser roll 14 is hollow. A heat lamp (not shown) within the fuser roll 14 is used to heat the roll to the fusing temperature, typically about 170° to 190° C.

The pressure roll 16 typically comprises a silicone rubber, or a coating thereof on a substrate. The hardness of the silicone rubber is about 40 to 70 durometer.

In accordance with the invention, the surface of the fuser roll 14 is provided with a coating 18 comprising a mixture of about 60 to 90 wt % polyphenylene sulfide (PPS) and the balance (10 to 40 wt %) polytetrafluoroethylene (PTFE, also known as Teflon). Preferably, the coating comprises about 70 wt % PPS and 30 wt % PTFE.

The composition further includes about 10 to 40 wt % of a filler, based on the total composite composition. The filler acts to control the thermal conductivity of the composite, thereby affecting offset. (The temperature at which the image is fixed to the paper is known as the fix temperature. Above this temperature, the toner becomes fluid and it splits apart during fusing, leaving traces of toner on the fuser roll to contaminate the next sheet of paper. This phenomenon is often referred to as "offset".)

Examples of fillers suitably employed in the practice of the present invention include glass (fiber), clay, carbon black, metallic powders, or mixtures thereof. The particle size of the filler ranges from about 5 to 12 $\mu$m.

The pressure roll 16 is tensioned (by means not shown) to provide a pressure in the nip between the two rolls 14, 16 of about 46 psi (3.2 kg/cm$^2$), which is used in present electrophotographic printers and copiers. The speed of the electrophotographic printer employing the coated fuser roll 14 of the invention is between 80 and 229 pages per minute. Thus, the coated fuser roll of the invention may be retrofit into existing electrophotographic printers and copiers, and will exhibit the same or better performance as present fuser rolls.

The advantages of the new PPS-PTFE composite material are as follows:
1. High heat resistance (up to 560° F., or 293° C.);
2. Superior dimensional stability;
3. High rigidity;
4. Exceptional chemical resistance;
5. Excellent electrical and mechanical properties.

The factors which contribute to better dimensional stability of the PPS-PTFE composite include high impact strength, better chemical resistance, lower creep, high deflection temperature, and high rigidity, as compared to PTFE alone.

The benefits of using the PPS-PTFE composite material of the present invention in fuser roll toner fusing in electrophotographic printing and copying are as follows:

(a) Better fusing with 16 pound papers (smoothness 230 to 300 Sheffield units);
(b) Excellent fusing with 20 pound papers (smoothness 70 to 150 Sheffield units);
(c) Reduction in gloss (which helps in bar code scanning);
(d) Better operating parameters for the hot offset.
(e) Longer fuser roll life.

The Sheffield number provides a measure of the roughness or smoothness of the paper surface, with higher numbers indicating a rougher surface. Rougher papers have poor contact with the non-compliant PTFE rolls of the prior art. The same rougher paper has better contact with the PPS-PTFE rolls of the present invention, since the composite material in the fuser roll is much more compliant. This results in better fusing.

With regard to the hot offset, usually, the toner is formulated for a particular type of fuser roll material. This limits the printer/copier to run at a particular fuser roll temperature. The new PPS-PTFE composite material roll is not limited to a narrow range of fix temperature. This is called a larger operating window for the new material. The other factor is that the composite material of the present invention is compatible with different toner formulations.

With regard to longer fuser roll life, the PPS-PTFE coated fuser roll has fused over 3.5 million pages of paper, without significant wear. In comparison, fuser rolls coated with pure PTFE fuse about 2.5 million pages of paper before wearing out, while fuser rolls coated with silicone rubber fuse about 500,000 to 600,000 pages of paper before wearing out.

In addition, the matt finish of the fused toner on paper employing the composite material of the present invention as the fuser roll reduces the gloss associated with images fused with pure Teflon fuser rolls.

The Teflon in the PPS-PTFE composite coating provides toner release properties, so that toner is not transferred from the paper sheet to the fuser roll, but rather is fused to the paper. The PPS in the PPS-PTFE provides the matt finish described above. Because of the improved compliance that the PPS provides, better contact of the fuser roll with rougher papers is achieved at both low toner pile height and at high toner pile height, which improves fusing of the toner to the paper.

The PPS-PTFE composite of the invention is formulated by combining polyphenylene sulfide, polytetrafluoroethylene, and the desired filler in the requisite amounts in liquid form and mixing thoroughly. The liquid is then applied to the metal fuser roll tube 14 by any of a variety of techniques, such as spray coating, liquid injection molding, or dipping. Polyphenylene sulfide is commercially available in high molecular weight form, MW=about 100,000 to 150,000, from Phillips Petroleum, Chemical Division (Bartlesville, Okla.), under the trade designation RYTON. Polytetrafluoroethylene is available from DuPont de Nemours (Wilmington, Del.) under the trade designation Teflon; the polymer is dispersed in a liquid medium.

A coating 18 of about 40 μm thick is formed on the fuser roll 14, and is then treated to provide a substantially smooth surface, such as by grinding and polishing or sandblasting.

EXAMPLES

A PPS-PTFE composite comprising 70 wt % PPS and 30 wt % PTFE, to which was added 40 wt % fiber glass filler, was prepared by combining the three ingredients in liquid form, mixing together, and spray coating an aluminum fuser roll tube. The PPS-PTFE composite had the following properties, compared to PTFE alone, as listed in Table I below.

TABLE I

| PPS-Teflon Composite Properties. | | |
|---|---|---|
| Property | PPS-PTFE | PTFE |
| Heat Deflection, °F. at 264 psi | >500° F. | 400° F. |
| (°C. at 19.3 kg/cm$^2$) | >260° C. | 204° C. |
| Tensile Strength, psi | 26.0 | 17.1 |

TABLE I-continued

| PPS-Teflon Composite Properties. | | |
|---|---|---|
| Property | PPS-PTFE | PTFE |
| (kg/cm$^2$) | 1.8 | 1.2 |
| Impact Strength, psi | 5.5 | 2.7 |
| (kg/cm$^2$) | 0.38 | 0.19 |
| Density, g/cm$^3$ | 1.66 | 1.32 |
| Dielectric strength, volt/mil | 360 | 304 |
| (volt/cm) | 0.14 | 0.12 |

A comparison was made between paper printed using a fuser roll coated with Teflon and a fuser roll coated with the composition of the invention. In particular, the PPS-PTFE composition comprised 70 wt % PPS and 30 wt % PTFE, with 40 wt % added fiber glass filler, based on the total composition. Two weights of paper were printed on: 16 lb and 20 lb. In each case, the optical density of the resulting fused print was measured, the fuse grade, and the percent smear.

Optical density was measured by use of a MacBeth densitometer. The higher the value, the darker the print.

Fuse grade was measured by scratching the fused toner with a fingernail and comparing the results with an internal grading system. The higher the number, the better the fusing. A value of at least 5 is considered to be acceptable.

Smear was measured by a transparency tape peel test of the fused toner under a given load (here, 150 g) and measuring the optical density prior and subsequent to the peel test. An optical density loss value of 25% or lower is considered to be acceptable.

The results of the foregoing tests are tabulated in Table II below.

TABLE II

| PPS-PTFE Fuser roll Performance. | | | | | | |
|---|---|---|---|---|---|---|
| | 16 lb Paper | | | 20 lb Paper | | |
| Hot Roll | Optical Density | Fuse Grade | Smear % | Optical Density | Fuse Grade | Smear % |
| PTFE | 1.07 | 4 | 35.5 | 1.18 | 5 | 19.4 |
| PPS-PTFE | 1.17 | 7 | 9.4 | 1.23 | 7 | 4.8 |

It is seen that in all categories, the PPS-PTFE fuser roll coating was superior to PTFE alone. Specifically, the print was darker on both papers, the fusing quality was improved, and the smear was lower for the fuser roll composition of the invention.

Further, there was a considerable reduction in gloss. For PTFE alone, the gloss was measured at 26.4 gloss units, while for PPS-PTFE, the gloss was measured at 6.8 gloss units. The lower gloss values produce matt finish prints, which are better for applications where light glare is a problem, such as in bar code scanning, optical character recognition, etc.

INDUSTRIAL APPLICABILITY

The coated fuser roll of the invention is expected to find use in electrophotographic printers and copiers.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such modifications, applications, and embodiments within the scope of the present invention.

Accordingly,

What is claimed is:

1. A fuser roll for fusing toner in electrophotographic printers and copiers comprising a hollow metal tube provided with a coating, wherein said coating consists essentially of (a) about 60 to 90 wt % of a polymer blend consisting essentially of about 60 to 90 wt % polyphenylene sulfide and about 10 to 40 wt % polytetrafluoroethylene, and (b) about 10 to 40 wt % of a filler.

2. The fuser roll of claim 1 wherein said filler is selected from the group consisting of glass, clay, carbon black, and metallic powder.

3. The fuser roll of claim 2 wherein said coating includes about 40 wt % of fiber glass filler.

4. The fuser roll of claim 1 wherein said coating comprises about 70 wt % polyphenylene sulfide and about 30 wt % polytetrafluoroethylene.

5. The fuser roll of claim 1 wherein said coating comprises (a) about 60 wt % of a polymeric blend consisting essentially of about 70 wt % polyphenylene sulfide and about 30 wt % polytetrafluoroethylene and (b) about 40 wt % of a fiber glass filler.

6. A fuser roll for fusing toner in electrophotographic printers and copiers comprising a hollow metal tube provided with a coating, wherein said coating consists essentially of (a) about 60 to 90 wt % of a polymer blend consisting essentially of about 70 wt % polyphenylene sulfide and about 30 wt % polytetrafluoroethylene and (b) about 10 to 40 wt % of a filler.

7. The fuser roll of claim 6 wherein said filler is selected from the group consisting of glass, clay, carbon black, and metallic powder.

8. The fuser roll of claim 7 wherein said coating includes about 40 wt % of fiber glass filler.

9. An improved process for fusing toner to a print medium in an electrophotographic printer or copier, comprising passing said print medium through a nip defined by a fuser roll and a pressure roll, said fuser roll comprising a hollow metal tube provided with a heat lamp therein and with a coating on its outer surface, wherein the improvement comprises applying to said outer surface of said fuser roll a coating consisting essentially of (a) about 60 to 90 wt % of a polymer blend consisting essentially of about 60 to 90 wt % polyphenylene sulfide and about 10 to 40 wt % polytetrafluoroethylene, and (b) about 10 to 40 wt % of a filler.

10. The process of claim 9 wherein said filler is selected from the group consisting of glass, clay, carbon black, and metallic powder.

11. The process of claim 10 wherein said coating includes about 40 wt % of fiber glass filler.

12. The process of claim 9 wherein said coating comprises about 70 wt % polyphenylene sulfide and 30 wt % polytetrafluoroethylene.

13. The process of claim 12 wherein said coating includes about 40 wt % of fiber glass filler.

14. An improved process for fusing toner to a print medium in an electrophotographic printer or copier, comprising passing said print medium through a nip defined by a fuser roll and a pressure roll, said fuser roll comprising a hollow metal tube provided with a heat lamp therein and with a coating on its outer surface, wherein the improvement comprises applying to said outer surface of said fuser roll a coating consisting essentially of (a) about 60 to 90 wt % of a polymer blend consisting essentially of about 70 wt % polyphenylene sulfide and about 30 wt % polytetrafluoroethylene and (b) about 10 to 40 wt % of a filler.

15. The process of claim 14 wherein said filler is selected from the group consisting of glass, clay, carbon black, and metallic powder.

16. The process of claim 15 wherein said coating includes about 40 wt % of fiber glass filler.

* * * * *